Oct. 29, 1957  J. VAN ACKEREN  2,811,424
APPARATUS FOR THE RECOVERY OF AMMONIA FROM COKE OVEN GAS
Filed Feb. 24, 1953  7 Sheets-Sheet 1
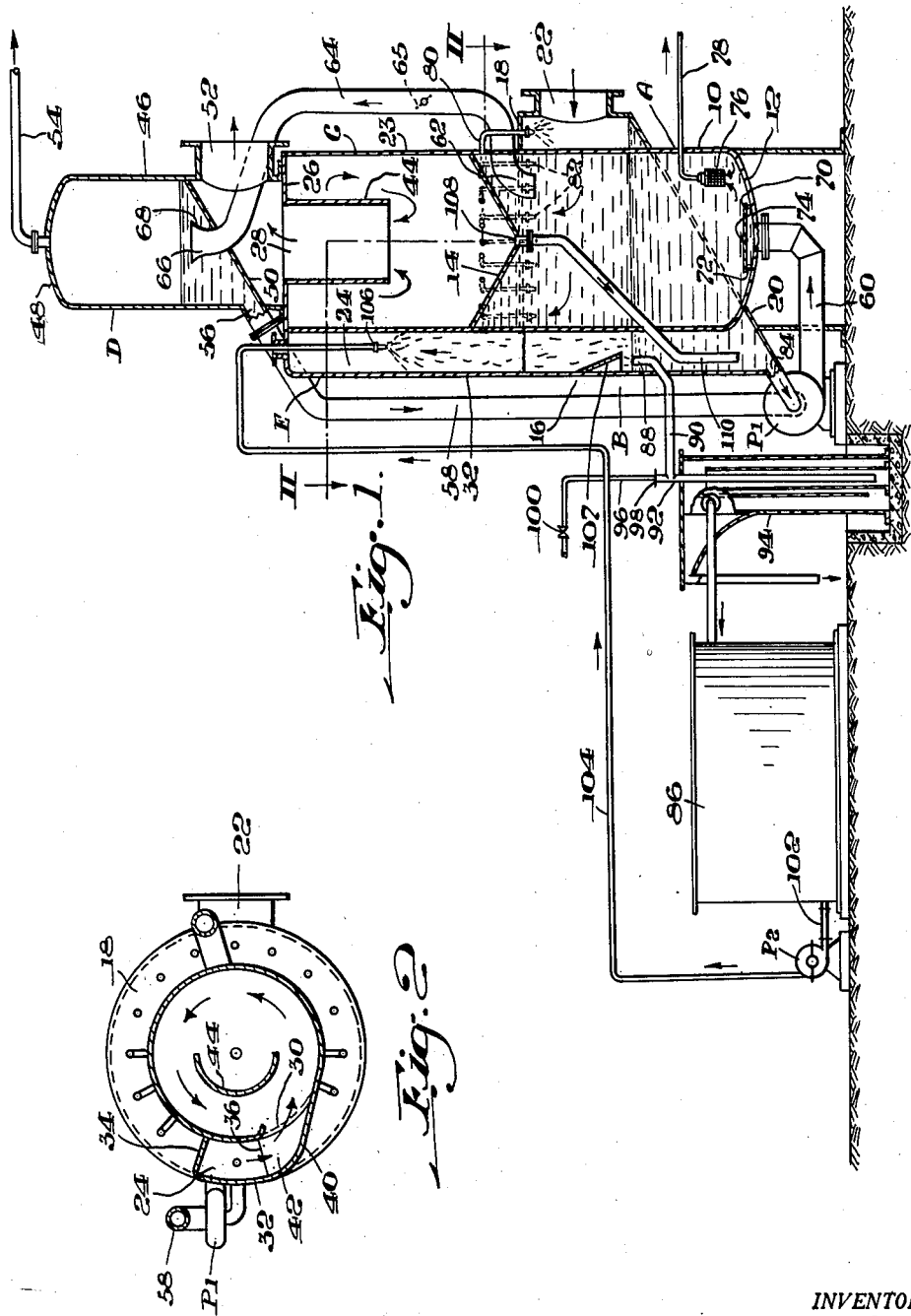
INVENTOR.
JOSEPH VAN ACKEREN
BY
George Johannesen
ATTORNEY.

INVENTOR.
JOSEPH VAN ACKEREN.

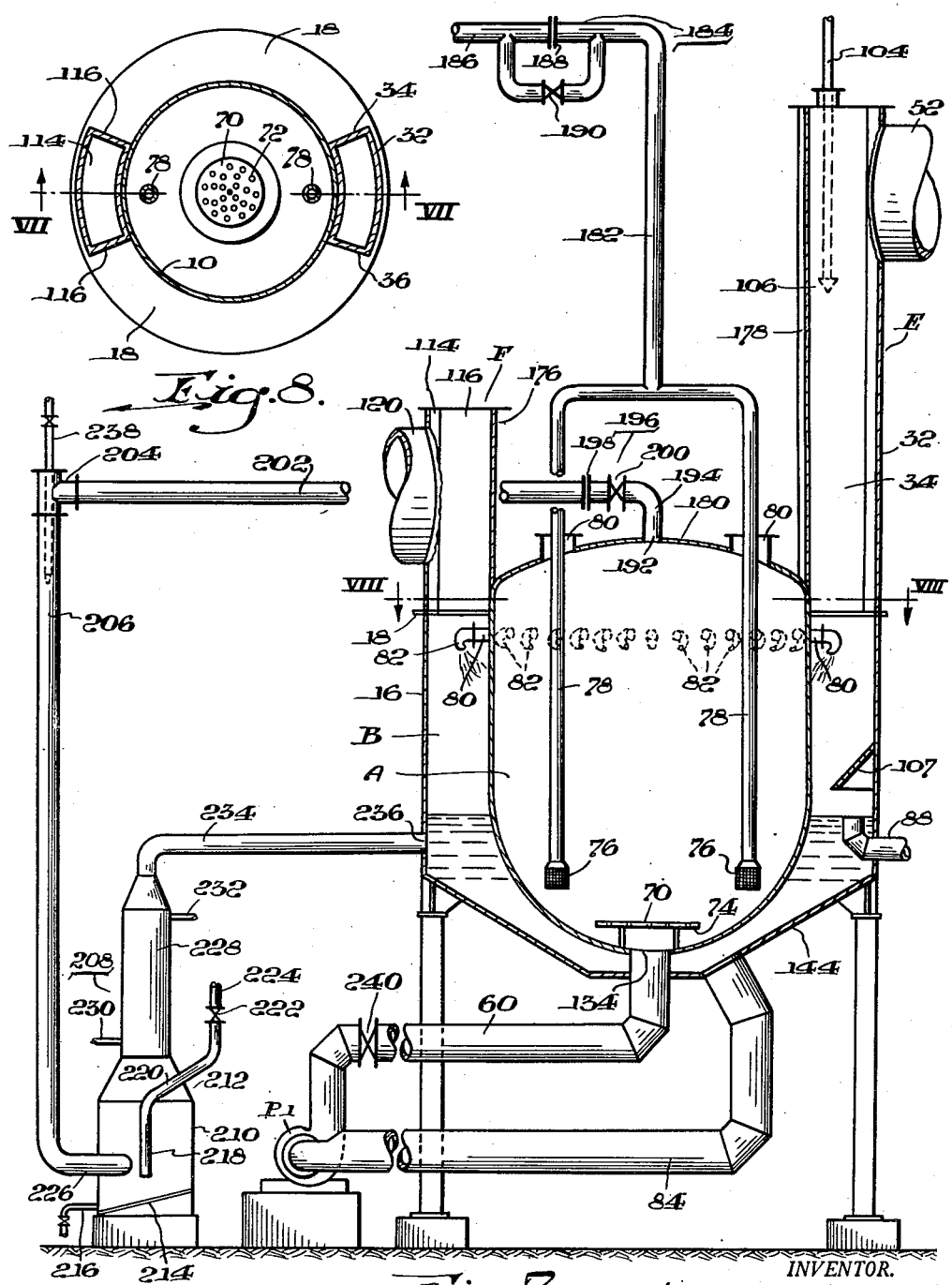

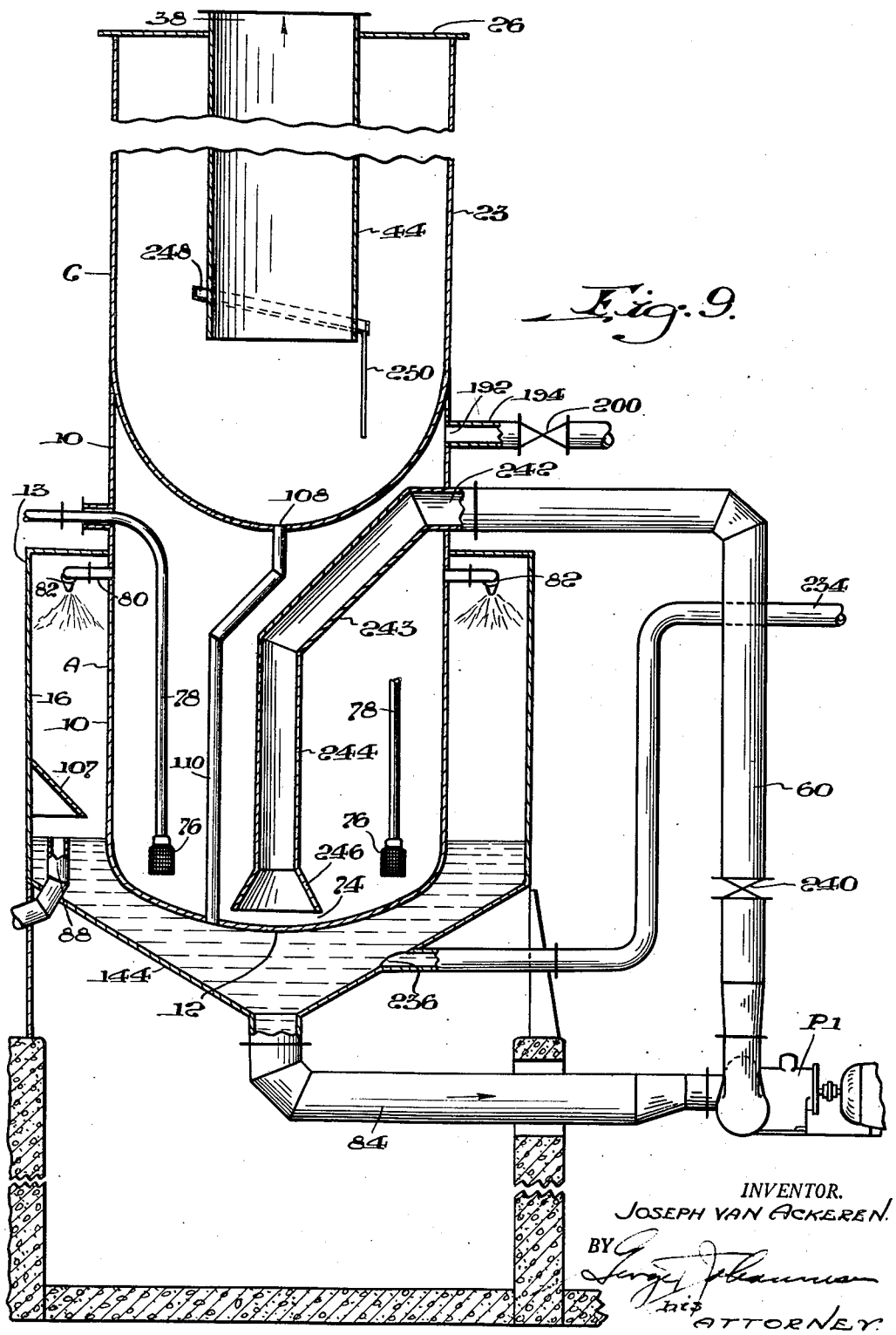

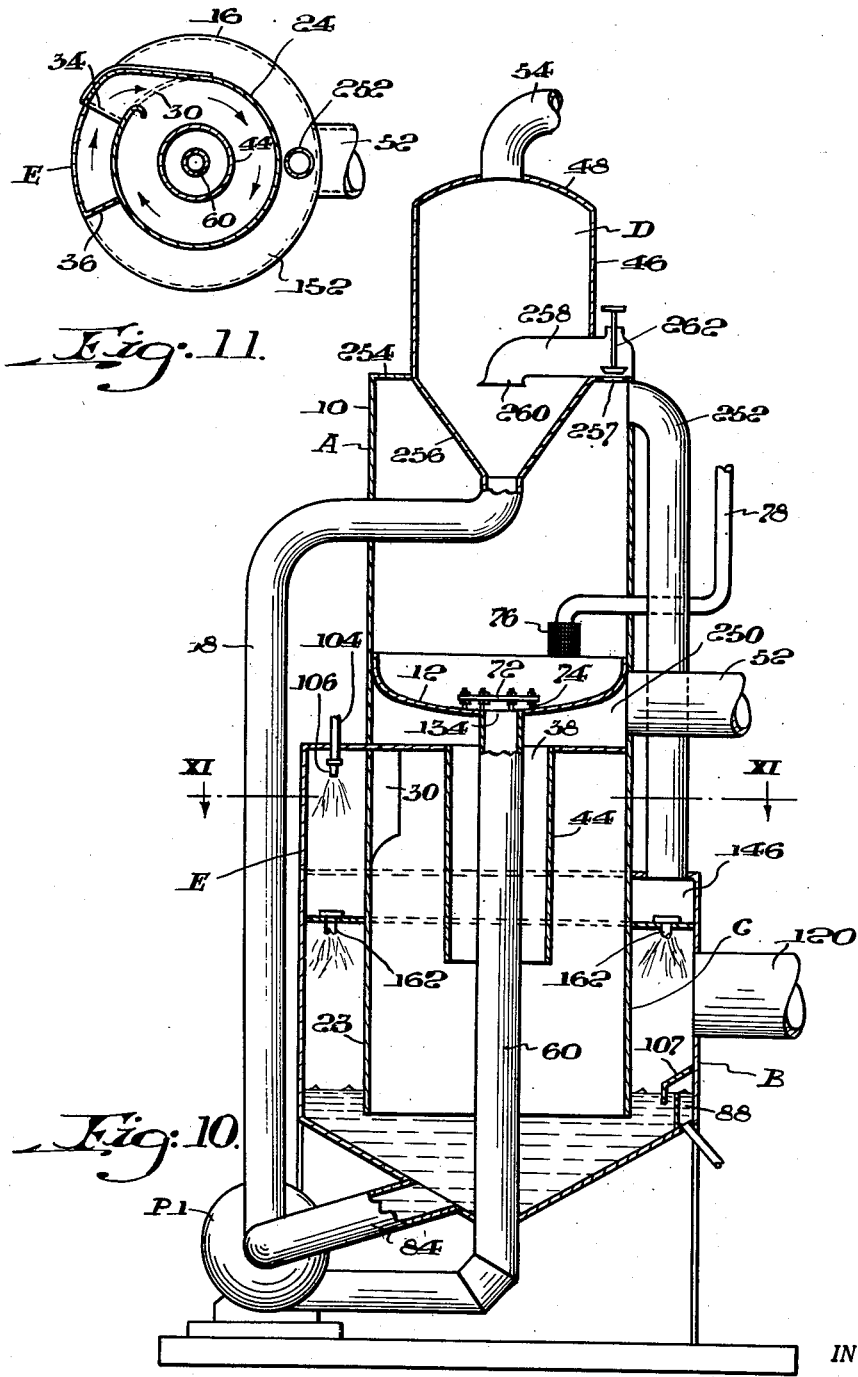

United States Patent Office 2,811,424
Patented Oct. 29, 1957

2,811,424

APPARATUS FOR THE RECOVERY OF AMMONIA FROM COKE OVEN GAS

Joseph van Ackeren, Pittsburgh, Pa., assignor to Koppers Company, Inc., a corporation of Delaware Application February 24, 1953, Serial No. 338,367

10 Claims. (Cl. 23—273)

This invention relates to apparatus for the concurrent absorption of a material from a gas and the crystallization of the resulting product from the absorbent solution and is particularly directed to ammonia saturators suitable for absorbing ammonia from coke-oven gas in a dilute solution of sulfuric acid and crystallizing ammonium sulfate from the ammonium sulfate-rich sulfuric acid solution.

It is customary in the by-product coke-oven art to recover the ammonia in the coke-oven gas in what is generally referred to as an "ammonia saturator." The ammonia saturators are designed to effect intimate contact between the coke-oven gas and a dilute solution of sulfuric acid, and to effect a crystallization of ammonium sulfate as the absorption of ammonia in dilute sulfuric acid solution is continued. As ammonia is continued to be absorbed in the dilute sulfuric acid solution the concentration of dissolved ammonium sulfate gradually builds up to the concentration at which crystals form and as the process is continued the ammonium sulfate which is being continuously made by the reaction between the ammonia and sulfuric acid is deposited on the formed crystals so that continuous concurrent absorption and crystallization results.

Difficulty has been encountered in the past in operating ammonia saturators primarily because of the large volume of gas undergoing processing. Since ordinary coke-oven gas contains very little ammonia, say around one or two percent at the most, it is evident that a large volume of coke-oven gas must be brought into contact with the dilute solution of sulfuric acid for each unit of ammonium sulfate produced. Difficulties have also been encountered because of the corrosive nature of the solutions involved.

In recent years improvements have been introduced for effecting contact between the coke-oven gas and the dilute sulfuric acid solution in which the pressure differential across the contact zone has been substantially reduced. This has largely been accomplished by use of spray type absorbers in which dilute sulfuric acid solution is sprayed into contact with the coke-oven gas. The corrosion problem also has been attacked by using expensive alloys such as stainless steel and Monel metal. The two together while effecting economies not previously obtainable have resulted in increased capital investment.

Another difficulty encountered in these types of ammonia saturators is that of obtaining satisfactorily large crystals. This difficulty too has been augmented by efforts to simplify the design of the saturator and thereby minimize the capital investment.

The present invention relates particularly to improvements in such spray type ammonia saturators in which the economy of operation characteristic of such saturators is obtained without excessive capital investment and without sacrifice in those characteristics through which large crystals of ammonium sulfate are obtained. These desiderata are accomplished by an arrangement of the various units required in such processes, for example, a classification type crystallizer and a spray type absorber, as primary units, with or without secondary units such as mist precipitators and vacuum evaporators, into a unitary structure of economical design and high operative efficiency.

The invention may be more fully understood by reference to the accompanying drawing, illustrating several forms of the invention in which the various features of novelty as will be more particularly pointed out as the description proceeds, are variously embodied.

In the drawings,

Figure 1 is a side elevation partly in section of a preferred embodiment of the invention;

Figure 2 is a plan view partly in section taken along line II—II of Figure 1;

Figure 7 is a side elevation, partly in section, of another preferred form of the invention;

Figure 8 is a sectional view taken along line VIII—VIII of Figure 7;

Figure 9 is a side elevation partly in section of another preferred form of the invention;

Figure 10 is a side elevation, partly in section, of another preferred form of the invention; and Figure 11 is a sectional view taken along line IX—IX of Figure 10.

Figure 3:
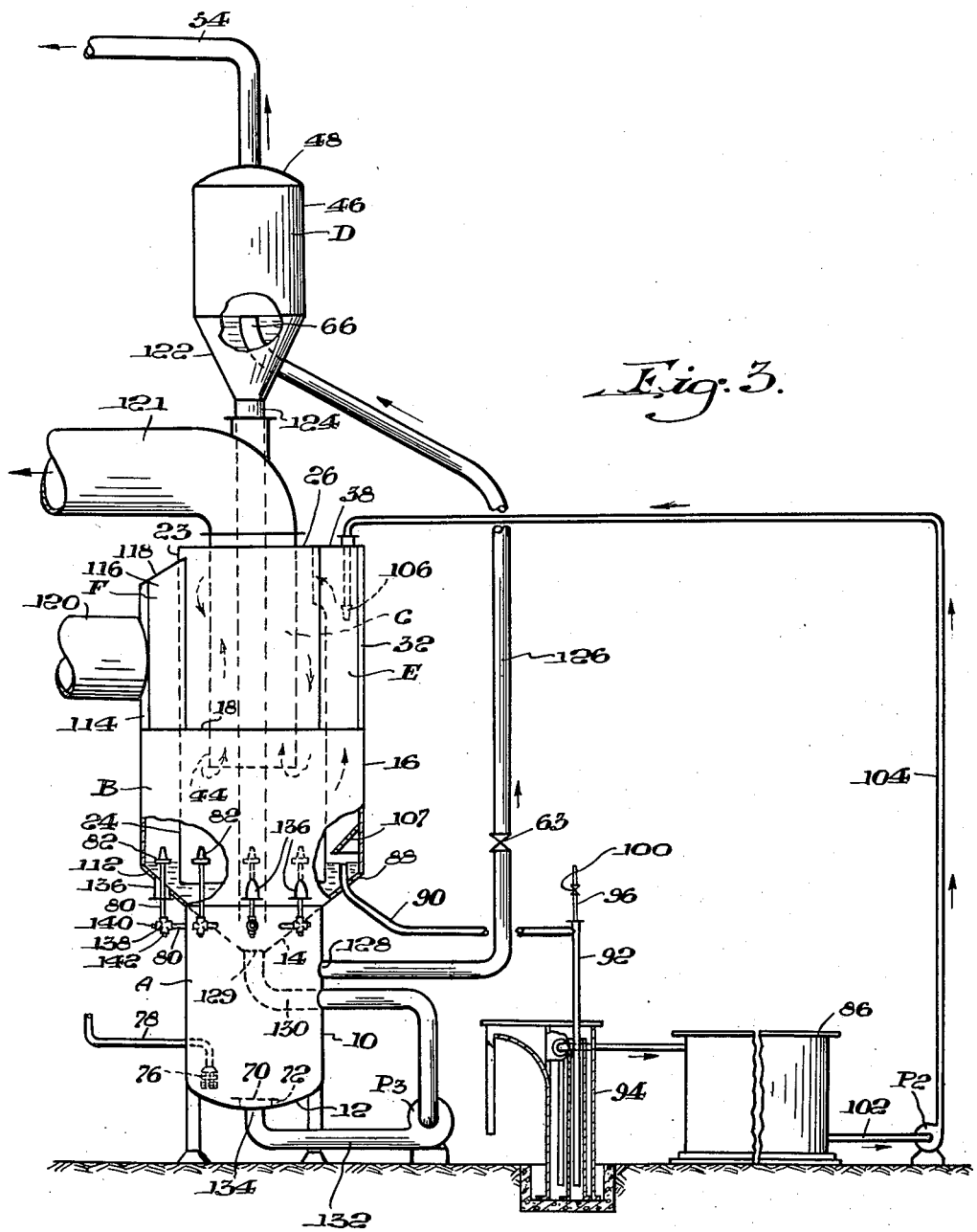
Figure 3 is a side elevation with parts broken away to show details of construction of another preferred embodiment of the invention.

Referring now particularly to Figures 1 and 2, there is illustrated an arrangement of apparatus embodying four units, namely, a crystallizer unit A, an absorber unit B, a mist precipitator unit C and a vacuum evaporator D. All four units are constructed of cylindrical members arranged about a common vertical axis in a manner designed to effect economy of construction and improved operational characteristics.

The crystallizer unit A is constructed with a cylindrical portion 10 constituting the side walls of a crystallizer, a disc-shaped bottom 12 and a cone-shaped top 14 with its apex projecting downwardly into the crystallizer. Except for inlets and outlets as will be described the cylindrical portion 10 and the top and bottom portions 14 and 12 respectively are united in a unitary gas and liquid-tight vessel.

The absorber B is constructed of a cylindrical member 16 concentric with the axis of the cylindrical member 10 of the crystallizer A, an annular top wall 18 sealing the space between the cylindrical member 10 of the crystallizer A and the cylindrical member 16 of the absorber B and a sloping bottom 20 sealing the space between the cylindrical member 16 of the absorber B and the outer walls of the crystallizer A. Except for inlets and outlets as will be described the cylindrical member 16, the top and bottom walls 18 and 20 form together with the outer walls of the crystallizer A, a gas-tight annular vessel. It will be observed that this annular vessel substantially surrounds the crystallizer and has a wall in common therewith. This construction results in economy because of the common wall and improved efficiency of the crystallizing operation because of the jacketing effect of the absorber which tends to make the crystallizing operation less sensitive to the variations in ambient temperature.

The absorber B is provided with a gas inlet 22 at one side and a gas outlet 24 at the diametrically opposite side (Fig. 2). Coke-oven gas enters through the inlet 22 and divides into two streams, one passing around the left side of the crystallizer A and the other passing around the right side of crystallizer A. The two streams unite at the diametrically opposite side and pass upwardly out through outlet 24 which, as shown, is located in the annular top plate 18.

The mist separator C is constructed of a cylindrical portion 23 which is a continuation of the cylindrical portion 10 of the crystallizer A. It is partly closed at the top front by an annular top plate 26 thus leaving an outlet opening 28. The cylindrical wall 23 is provided with a tangentially disposed inlet 30 (Fig. 2) which communicates with outlet 24 of the adsorber B by means of the riser E. Riser E is formed of an arcuate outer plate 32 and radial side plates 34 and 36. These together with the cylindrical wall 23 of the mist precipitator C and an extension 38 (Fig. 2) of the top 26 form a gas-tight conduit leading from the outlet 24 of the absorber B to the tangential inlet 30 of the mist separator C. The riser E communicates with the tangential outlet 30 by lateral conduit formed of curved wall 40, a bottom wall 42 and a top wall (not shown) which suitably is an extension of the top 26 of the mist separator C. These three walls are united together and with the contiguous parts of the riser and the mist separator C form a gas-tight conduit leading from the riser E to the tangential inlet 30. Depending from the outlet 28 in the top 26 is a cylindrical member 44 which acts as a baffle between the tangential inlet 30 and the central outlet 28. The cylindrical baffle 44 desirably extends to a point below the tangential inlet 30. This baffle in cooperation with the tangential opening 30 operates to produce the vortex necessary to the separation of the mist particles suspended in the gas.

The vacuum evaporator D is constructed as a cylindrical member 46 extending upwardly from the top 26 of mist separator C having a top plate 48 which is dome-shaped in order more fully to withstand the atmospheric pressure when a vacuum is pulled therein and a sloping bottom 50. The cylindrical wall 46, the top 48 and the bottom 50 are united in a unitary structure which except for outlets and inlets, as well be described, are gas-and liquid-tight. The bottom portion of the cylinder 46 together with the bottom 50 form a gas-tight conduit between the outlet 28 of the mist separator C and an outlet 52 in the cylinder 46. In the construction described, therefore, it will be seen that gas is introduced through inlet 22 and exits through outlet 52.

The vacuum evaporator D is provided with an outlet in top 48 which communicates through line 54 to a suitable barometric condenser, not shown. It is provided at the bottom with an outlet 56 which communicates through pipe 58 with the suction side of pump P-1 and in turn through line 60 with the bottom of crystallizer A. At the top of the crystallizer A there is provided an outlet pipe 62 which communicates through pipe 64 with inlet pipe 66 located in the vacuum evaporator D. The outlet pipe 62 projects into the crystallizer A and is directed downwardly so that the solution is withdrawn at an elevation somewhat below the top of the crystallizer A. The inlet pipe 66 of the vacuum evaporator D projects upwardly through the bottom 50 to an elevation somewhat below the normal liquid level in the evaporator and is provided with an enlarged portion 68 intended to provide a reduction in the velocity of flow as the solution enters the vacuum evaporator. A circuit is thus provided in which solution is withdrawn from the crystallizer near the top thereof through inlet pipe 62, transferred through pipe 64 to the vacuum evaporator D through inlet pipe 66, then through outlet 56, the pipe 58, pump P-1, and pipe 60 back to the crystallizer A. A suitable throttling valve 65 may be provided in line 64 to regulate the flow in this circuit. The pipe 60 opens axially into the bottom of the crystallizer and the flow is deflected radially by means of plate 70 forming with the bottom 12 of the crystallizer A a radial orifice 72. The plate 70 is provided with one or more perforations 74 to provide a vertical component which operates to reduce eddys which would otherwise be induced by the introduction of the solution radially through annular orifice 72. The solution thus flows upwardly through the crystallizer A where it effects a classification of crystals therein, the larger crystals settling toward the bottom and the smaller crystals rising toward the top. By the time the solution reaches the outlet pipe 62, it is essentially a desupersaturated solution. When it reaches the vacuum evaporator D, evaporation of water therein as a result of the vacuum pulled thru line 54, results in supersaturation of the solution, and this supersaturated solution is returned to the crystallizer, as already described, where the supersaturation is discharged by contact with the crystals suspended in the solution in the crystallizer. A suitable suction head 76 is provided adjacent the bottom of the crystallizer bowl A thru which a crystal slurry or magma is withdrawn thru line 78 to a suitable crystal recovery unit, not shown.

At the top of the crystallizer A are provided a plurality of outlets arranged circumferentially at spaced intervals. These outlets communicate thru pipes 80 with a plurality of spray heads 82 arranged to discharge a spray of desupersaturated solution from the top of said crystallizer into the annular vessel constituting the absorber B. It will be observed that the top 18 of the absorber vessel is located just below the top of the crystallizer A so that the connection between the crystallizer and the spray head is individual and direct. Economy of material is thus provided by the small size and the short lengths of the pipes 80 and economy of operation is provided due to the short flow path between the crystallizer A and the spray head 82. In my co-pending application Serial No. 51,724 filed September 29, 1948, now Patent Number 2,671,011, I have also disclosed and claimed an apparatus for the removal of ammonia and pyridines from a gaseous mixture in which gas flows in curvilinear paths through a semi-circular chamber and is sprayed from above.

The spray from the spray heads 82 collects in the bottom of the absorber vessel and in turn flows out thru outlet pipe 84 to the inlet side of pump P-1 where it is commingled with supersaturated solution flowing down pipe 58.

As the liquor in the absorber B is under the pressure of coke oven gas and the liquor in the evaporator D is under the pressure of the vacuum pulled therein, a balance will be maintained according to said pressures and to the height of the hydrostatic column in each. Hence if more liquor is added to the system so as to tend to raise the level of the liquor in the absorber B, there will be a corresponding rise of the level of the liquor in the vacuum evaporator D. Since liquor is being continually added to the process from the mother liquor storage tank 86 as will be more fully described, an overflow means 88 is provided in the absorber B to keep the level of liquid therein constant.

Overflow means 88 communicates thru pipe 90 with a pipe 92 extending into a tar skimmer 94 of conventional design. A smaller pipe 96 projects into pipe 92 thru a suitable top plate 98 and is utilized for introducing make-up acid. The pipe 96 is provided with a suitable valve 100 for regulating the amount of make-up acid thus added. For most purposes, all of the acid required to maintain a condition of equilibrium is added here, but if desired, some may be added directly to the liquor in the absorber B.

The amount of make-up acid required to maintain an equilibrium condition is the stoichiometric equivalent of the ammonia absorbed. Ordinarily this amount of acid will be added either as 60° or 66° Baumé acid. Water is thus introduced into the system. This together with additional water which is sometimes added, as for example during a kill or during the operation to wash down various surfaces, together with other water which may be introduced in the operation of the process, makes up the surplus of liquor which is allowed to accumulate in the tank 86 and which is worked down during the process by the evaporation of water in the vacuum evaporator D and/or by the evaporation of water in the absorber B if the conditions of operation are such as to favor evaporation of water therein.

Because of the water introduced with the acid and the heating effect of the acid together with other water introduced in the process the liquor accumulating in the mother liquid storage tank 86 will ordinarily be unsaturated and will be of substantially higher acid concentration than the liquor in the main part of the apparatus. This unsaturated and higher acid liquor is withdrawn through line 102 by means of pump P2, transferred thru line 104 to sprayhead 106 where it is sprayed downwardly in the riser E into the upwardly flowing gas effluent from the absorber B. A suitable baffle 107 is provided to deflect this spray from the overflow 88. The gas is thus brought into contact with a secondary absorbent to strip out the last traces of ammonia and any pyridine which is carried over with the effluent gas.

At the nadir of cone 14 is an outlet 108 which communicates into pipe 110 with the absorber B, thru which condensed mist which is collected in the separator C which contains ammonia and is rich in pyridine is released into the solution in the saturator. The pyridine which is thus retained in the saturator solution by virtue of the contact in the absorber B, secondary contact in the riser E and in the further contact in the mist separator C may be recovered by bleeding off saturator solution as required to keep the pyridine content sufficiently low and treating it to recover the pyridine therefrom.

Referring now to Fig. 3, there is illustrated another arrangement of apparatus suitable for carrying out the same type of processes as the form illustrated in Figs. 1 and 2. In describing this figure and the other figures of the drawing like numerals and letters will be utilized to designate like constructions.

In this arrangement the crystallizer A is constructed substantially as described in connection with Fig. 1 with a cylindrical wall 10 concentric about the vertical axis of the entire unit with a concave bottom 12 and a conical top section 14.

The absorber B is formed of a cylindrical portion 16, an annular top plate 18 and a conical bottom 112 which is an extension of and includes the top 14 of the crystallizer A. The top 14 of crystallizer A therefore constitutes a wall in common with the absorber B and the crystallizer A. The inner wall of the absorber is formed by the outer cylindrical wall 23 of the mist separator C and the top annular plate 18 unites the cylinder 16 and the cylinder 24 to form a gas and liquid-tight unit except for inlets and outlets as will be described.

The riser E is constructed as described in Fig. 1 with an arcuate front plate 32, radial side plates and a top 38 which is an extension of the top 26 of the mist collector C. Diametrically opposite the riser E is a downcomer F similarly constructed with an arcuate front plate 114 and radial side plates, as for example, as shown at 116. A suitable top plate 118 covers the top of the downcomer and a suitable inlet pipe 120 is provided for entry of the coke-oven gas thereinto. Coke-oven gas thus flows in thru inlet 120 down the downcomer F into the absorber B where it splits into streams as described in connection with Fig. 1, unites and passes up thru the riser E into the mist separator C and out thru outlet pipe 121.

The vacuum evaporator D is constructed of a cylindrical wall 46, and arcuate top 48, and a conical bottom 122. The nadir of the conical bottom communicates with pipe 124 which projects axially into the saturator and terminates just above the nadir of the conical member 14 on the common wall between the crystallizer A and the absorber B. The riser 126 for the vacuum evaporator D communicates with the outlet 128 located adjacent the top of the crystallizer A and with the inlet pipe 66 of the vacuum evaporator D. Suitable throttling valve 63 is provided in this riser. Thus the desupersaturated solution in crystallizer A flows thru outlet 128, thru riser 126 into the vacuum evaporator D thru inlet pipe 66 and then thru downcomer 124 and into the absorber where it is discharged adjacent the nadir of bottom 14. From there it flows out the outlet 129 to pipe 130 which communicates with the suction side of the pump P-3 and is discharged from there thru line 132 upwardly into the crystallizer A thru the axial inlet 134 and radial orifice 72 formed by plate 70. The supersaturated solution from the vacuum evaporator D commingled with the rich solution from the absorber is thus flowed upwardly in the crystallizer thru the bed of crystals maintained therein and its supersaturation is thus discharged.

At intervals circumferentially arranged about and adjacent the top of the crystallizer A are outlet pipes 80 which communicate with spray heads 82. In this case the outlet pipes 80 project upwardly into the spray heads 82 which also are arranged to spray the solution upwardly into the absorber B. The pipes 80 project upwardly thru the conical bottom wall 112 thru suitable seals 136. In the pipe 80 there is provided a cross 138 with suitable cleanout plugs 140 and 142 whereby either the vertical or the horizontal leg of pipe 80 can be cleaned.

In other respects the construction and operation of the unit shown in Fig. 3 is the same as that shown in Fig. 1. It will be observed that the same advantageous arrangement whereby the spray heads are located close to the crystallizer and connected thereto by individual comparatively short connections common to both these apparatus. It will be observed also that the same arrangement of the similar units about a common vertical axis is maintained. It will be observed further that the same advantageous arrangement of the units to take advantage of the common walls, for example the common wall between the crystallizer and the adsorber B and the common wall between the absorber B and the mist collector C is present in both constructions.

Figure 4:
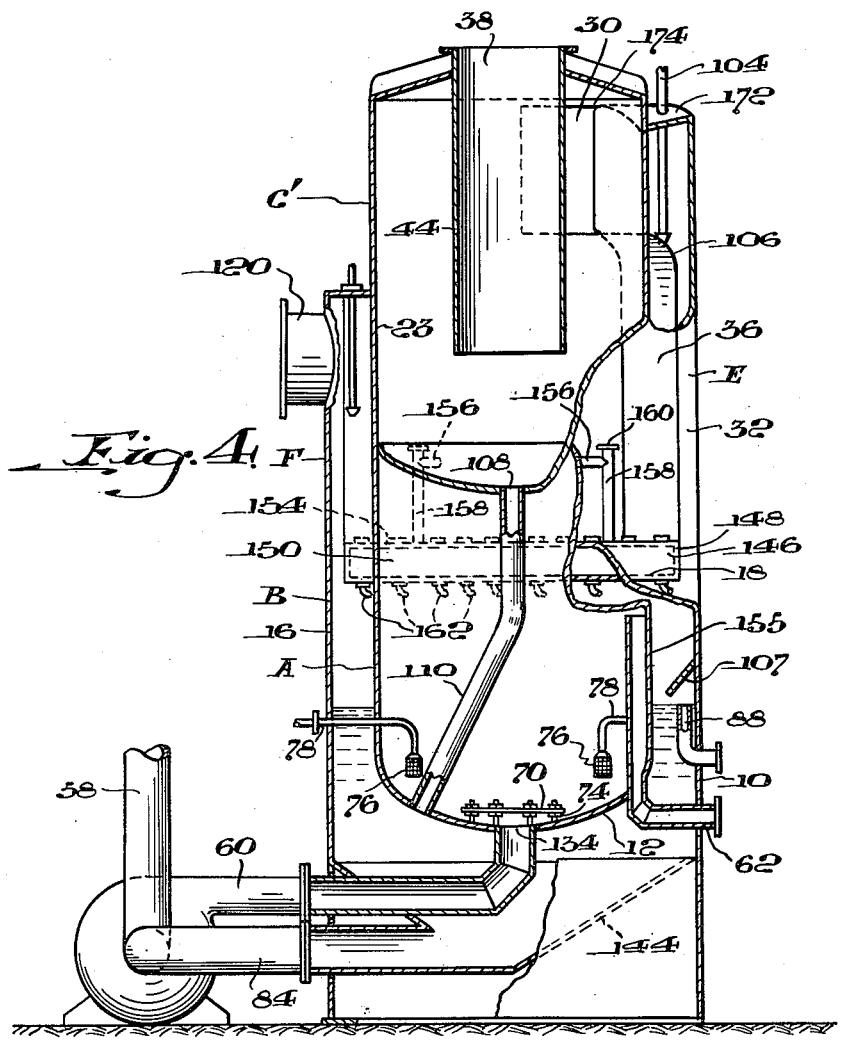
Figure 4 is a side elevation, partly in section, of another preferred embodiment of the invention.
Figure 5:
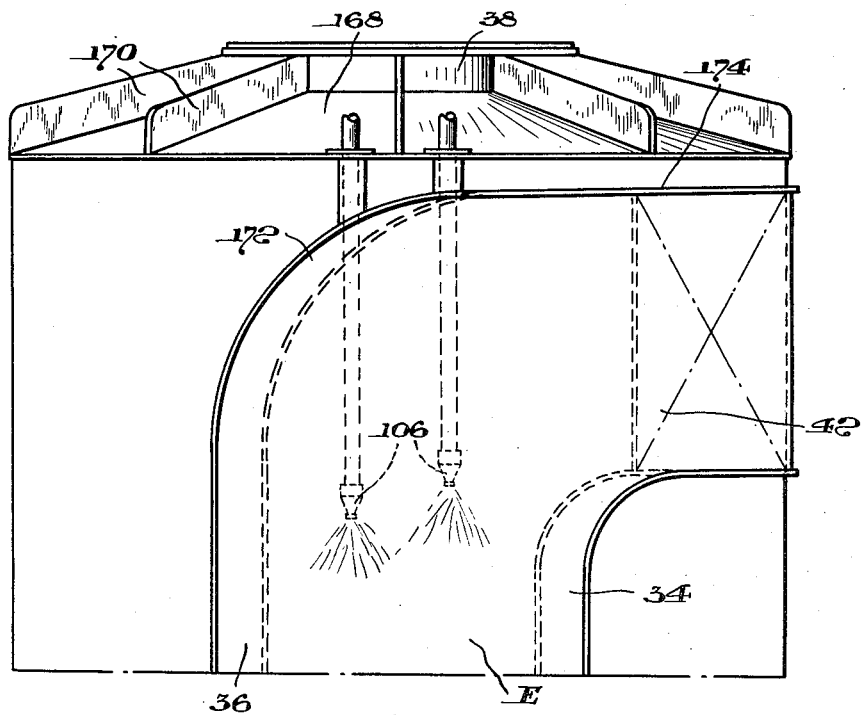
Figure 5 is a front detailed view of the top portion of Figure 4.
Figure 6:
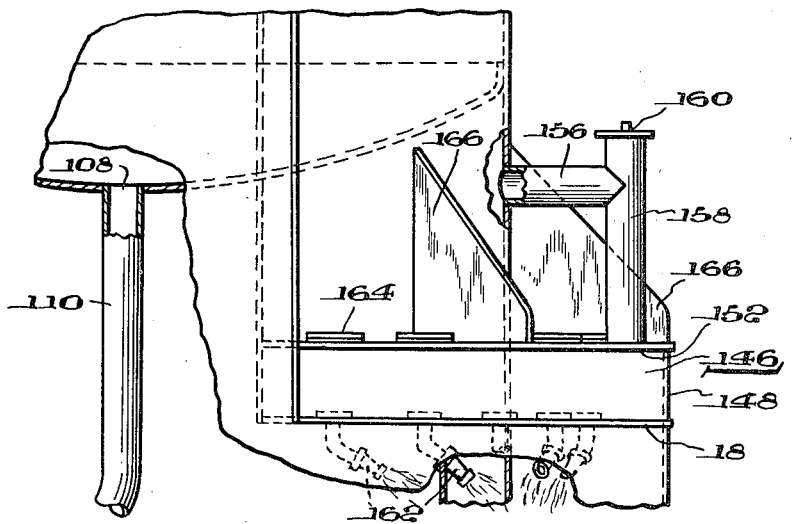
Figure 6 is a detailed view, with parts broken away for clarity, of the front middle portion of Figure 4.

Referring now to Figs. 4, 5, and 6, there is illustrated apparatus of the same general design as that illustrated in Fig. 1. Like parts here will refer to like parts as described in Figs. 1, 2, and 3. Attention will be focused upon differences rather than similarities.

The first primary difference is that the cylindrical member 10 is extended downwardly to a point below the bottom of the crystallizer A and is closed with a conical bottom 144. This provides for simpler construction and for complete jacketing of the crystallizer by the absorber unit.

Also instead of the spray heads being individually connected with the absorber they are connected thru a manifold 146. The bottom of the manifold 146 corresponds with top 18 of Figs. 1 and 3. The sides are formed by a cylindrical wall 148 extending from a radial side of the downcomer F to a radial side of the riser E and a similar cylindrical wall 150 extending from the other radial side of the downcomer F to the other radial side of the riser E. The top is formed of arcuate top plates 152 and 154. The top plates 152 and 154 and the cylindrical walls 148 and 150 are united with the contiguous portions of the top plate 18, the radial sides of the downcomer F and riser E, and the cylindrical wall 10 of absorber A to form a liquid-tight enclosure. The crystallizer A is provided with a plurality of outlet pipes 156 which communicate thru vertical pipes 158 with the manifold 146. Two or more of these may be provided for each section of the manifold. A removable cap 160 may be provided for cleanout purposes. Projecting into the absorber B at spaced intervals from the bottom of the bottom of the manifold 146 are a plurality of spray heads which, as is shown, are inclined with the axis of the cone of the spray sloping downwardly into the flow of gas. The angle of inclination is such that the elements of the cone spray intersect on all the surfaces of the absorber, including top surface 18, the cylindrical wall 10 and the cylindrical wall 16.

The outlet pipe 62 passes in thru wall 10 of the absorber B and up thru the bottom 12 of the crystallizer A to an elevation, as shown, near the top of the crystallizer. It is suitably formed with a curved member 155 welded to the inside wall of A and bottom 12 of crystallizer, as shown.

Fig. 6 shows details of this construction showing more clearly the outlet pipe 156, vertical pipe 158, and spray heads 162. In addition, there is shown removable covers 164 in top plates 162 of the manifold 146, arranged axially above the spray heads 162 so that access may be had to the spray heads for repair. Also there are shown suitable reinforcing plates 166 which may be welded in the angle between cylinder 10 and top plates 152 of the manifold.

As illustrated at Fig. 5, the top 168 slopes upwardly to the outlet 38 and is provided with reinforcing plates 170 at suitable intervals.

Also is shown in Fig. 5, the top of the riser E which is formed with a curved extension 172 of the radial side plate 36. This curved portion emerges between the radial side plate 36 and the flat top plate 174 which closes the lateral conduit 42 which communicates between the riser E and the inlet 30 of mist separator C.

Referring now to Figs. 7 and 8, there is illustrated still another form of the invention of simplified construction and improved design. Like reference numerals and letters again refer to like parts.

In this construction the top plate 18 of the absorber B is located above the outlet pipes 80, the spray heads 82 are mounted directly thereon at the minimum possible distance considering the desirability of centering the spray heads in the annular space between the cylinder 16 and the cylinder 10. This feature makes it possible to obtain still further economies and to obtain a more efficient operation.

A further feature is in the elimination of the mist collector of the cyclone type. In lieu of this any of the easily available centrifugal separators may be used, included in the outlet line 52. Inasmuch as the cylindrical wall 23 of the mist separator C is not present in this modification an arcuate inner wall 176 is provided for the downcomer and a corresponding arcuate wall 178 is provided for the riser.

In addition the top 180 is convex or dome-shaped which is more desirable in view of the fact that the crystallizer A is maintained under positive pressure of the circulating pump P–1. Also since the top is unobstructed, the lines 78 leading from the suction heads 76 can be taken directly thru the top, as shown. The slurry taken thru lines 78 passes thru line 182 to a suitable pressure reducing means 184, from there thru line 186 to suitable crystal recovery means (not shown). Pressure reducing means 184 comprises an orifice 188 in parallel arrangement with a throttling valve 190. By choice of a suitably sized orifice 188 the flow thru line 182 is easily regulated and adjusted by setting of the throttling valve 190. If the settling cone is located at the proper elevation, the pressure in the crystallizer may be sufficient to cause the slurry to flow at the desired rate to the settling cone without any throttling. In that case, the hydrostatic column in 182 serves as the necessary pressure reducing means. Additional pumping means may be used if the setting cone is higher than the hydrostatic column which can be maintained by the pressure in the crystallizer or if an increased rate of flow is desired.

An outlet 192 is provided at the apex of top 180 thru which liquor may be led into line 194 and thru a pressure reducing means 196 in a side stream circuit. The pressure reducing means 196 in this case consists of an orifice 198 in series with a suitable throttling valve 200. It will be understood that if desired the throttling valve 200 may be in parallel and that both parallel and series throttling valves may be used. Also if desired the orifice 198 may be omitted and reliance placed entirely upon the throttling valve 200.

The side stream flows thru pipe 202 thru T 204 into pipe 206, from there into heater and mixer unit 208. The heater and mixer unit 208 comprise a cylinder 210 having a truncated top 212 and inclined bottom 214 sloping to clean out line 216. Disposed axially in the cylinder 210 is a radially perforated pipe 218 which communicates thru pipe 220 and valve 222 with a steam line 224. The pipe 206 is connected with cylinder 210 thru a tangentially disposed inlet pipe 226 so that the liquid is introduced tangentially and whirls upwardly in cylinder 210 about the axial pipe 218. The liquor exists from cylinder 210 thru the top of the truncated section 212 into an indirect steam heater 228 of conventional design provided with steam inlet and outlets 230 and 232. The liquor exits from the indirect steam heater 228 thru line 234 whence it is returned to the absorber B thru an inlet 236 located below the liquor level. The small pipe 238 projects into pipe 208 thru the T 204. This pipe is used to introduce make-up acid into the side stream. The combined effect of the make-up acid due to its diluting and heating effect and the heating and diluting effect of the heater 208 is to effect dissolution of crystals which are carried over in the side stream thereby making it possible to reduce the number of nuclei in the system whenever it is desired to produce larger crystals. The side stream also can be utilized when desired as means for increasing or decreasing the upward velocity of the solution in the crystallizer A.

A throttling valve 240 is provided in line 60 so that the amount of pressure in the crystallizer and in turn the pressure applied to the spray heads 80 can be controlled as desired. It will be understood that similar throttling valves can be provided in the other modification already described.

While the above modification is particularly adapted and described for use without a vacuum evaporator it will be understood that a vacuum evaporator can be incorporated therein along the lines in Figures 1 and 4.

Referring now to Figure 9 there is illustrated a form of the invention combining some of the features of Figures 1 and 3 with those of Figure 7. Thus it will be observed that the outlet pipes 80 and spray heads 82 are arranged in essentially the same manner as in Figure 7 whereas other details of construction in regard to the crystallizer A, absorber B, and mist separator C are similar to Figure 4.

It will be observed, however, that line 60 which leads from the high-pressure side of pump P–1 instead of inleting into the bottom of the crystallizer A inlets adjacent the top thereof as shown at 242 whence the solution is led downwardly through pipe 243 having a vertical portion 244 arranged axially of the saturator with its bottom flared out at 246 and spaced from the bottom 12 of the crystallizer to provide the annular discharge orifice 74.

Also in the mist separator C around the cylindrical baffle 44 is provided a trough 248 which is inclined as shown and provided with outlet pipe 250 at its lowermost portion. The function of this trough is to collect mist which is deposited on the outside of the baffle 44 and to discharge it through pipe 250 to the bottom of the mist collector. This prevents the mist which collects on the baffle 44 from dribbling off the edge and being redispersed into the gas stream as it flows upwardly toward the outlet 38.

Referring now to Figures 10 and 11, there is shown a modification in which the position of the mist collector C and the crystallizer A are interchanged. The crystallizer A is located at the top outside of the absorber B and on top of the mist separator C, the bottom wall 12 of the crystallizer A forming the top of a conduit 250 leading to outlet pipe 52.

The pipe 60 leading from the high-pressure side of pump P-1 leads upwardly axially through the saturator to the inlet 34 of the crystalilzer A so that supersaturated solution is introduced into the crystallizer in the same way as already described in Figures 1 and 4. The supersaturated solution is then withdrawn at the top of the crystallizer A through line 252 into the header 146 which is constructed as already described in connection with Figure 4 and provided with a plurality of spray heads 162 similar to those in Figure 4.

The top of the crystallizer A is constructed of an annular portion 254 and an inverted conical portion 256 which also forms the bottom of the vacuum evaporator D. The annular top portion 254 is provided with an outlet 257 which communicates with pipe 258 having a downwardly projecting outlet 260. Liquor flows through outlet 257 into pipe 258 through the outlet 260 into the vacuum evaporator. Outlet 260 is arranged below the normal liquid level therein so that the liquid is discharged below the surface of the liquid therein. A suitable throttling valve 262 is provided in opening 257 whereby the flow of liquid from the crystallizer into the vacuum evaporator may be regulated as desired. By the same means, the pressure on the spray heads 162 likewise may be regulated.

Having thus set out the best modes devised for carrying out the invention and having pointed out some of the advantages of the invention over the prior art, it is understood that the invention is not limited in the particular respects described but may be variously embodied without departing from the spirit and scope of the invention as set forth in the specification and in the claims.

The invention having thus been fully described and illustrated, what is claimed to be new and patentable is:

1. A combined absorber and crystallizer comprising an enclosed cylindrical crystallizing vessel, an enclosed annular spray chamber surrounding said crystallizing vessel, gas inlet means and gas outlet means in said spray chamber, spray heads in said spray chamber arranged to spray liquid into the gas passing through said spray chamber from said gas inlet means to said gas outlet means, a collecting basin arranged to collect the spray after contact with said gas, conduit means leading from adjacent the top of said crystallizing vessel to said spray heads, conduit means leading from said collecting basin to the bottom of said cylindrical crystallizing vessel and pump means arranged to cause solution to flow from said collecting basin into said crystallizing vessel upwardly therethrough to said first conduit means and thence to said spray heads.

2. The apparatus of claim 1 in which the spray heads are arranged circumferentially about the outside of said cylindrical crystallizing vessel at an elevation near that of said first named conduit means.

3. A combined absorber and crystallizer comprising a cylindrical column divided into a crystallizing bowl and a mist separator by a wall intermediate the top and the bottom of said column, an absorption chamber surrounding said column having an outer cylindrical wall concentric with said column and a top wall located below the top of said column, a plurality of spray heads located in said absorption chamber, conduit means connecting said spray heads with said crystallizing bowl, pump means having its intake connected with said absorption chamber and its output connected with said crystallizing bowl, gas inlet conduit opening into said absorption chamber and gas outlet conduit leading from said absorption chamber to said mist separator, means for introducing the mist collected in said mist separator into the absorber solution, a spray head in said gas outlet conduit, an overflow in said absorption chamber, means for commingling make-up acid with the overflow from said absorption chamber and pump means for pumping the commingled overflow and make-up acid to said last named spray head.

4. An absorber and crystallizer comprising a cylindrical crystallizing vessel, an annular spray chamber concentric with said crystallizing vessel having a wall in common therewith, an annular top plate for said annular spray chamber, gas inlet conduit opening into said annular spray chamber, a gas outlet conduit located in said annular top plate diametrically opposite said gas inlet conduit, said gas outlet conduit projecting upwardly relative to said gas inlet conduit, a spray head located in said gas outlet conduit, a plurality of spray heads located in said annular spray chamber at spaced intervals about the periphery thereof, a first flow circuit for supplying liquor to said spray head, and a second flow circuit for supplying liquor to said plurality of spray heads, said first circuit including an overflow means in said spray chamber and a pump having a suction side operatively connected to said overflow and a pressure end connected to said spray head and said second circuit including a pump having a suction side connected to the bottom of said spray chamber and pressure side connected to said crystallizing vessel and outlet means for the flow of liquid from the upper end of said crystallizing vessel to said plurality of spray heads.

5. A combined absorber and crystallizer comprising an enclosed cylindrical vessel, a second cylindrical vessel, having a concave bottom, arranged within the first named cylindrical vessel and coaxially therewith thereby to provide an annular chamber between the two vessels, closure means for the top of said second vessel and said annular chamber, a conduit leading from the bottom of said first named cylindrical vessel to the suction side of a circulating pump, a second conduit leading from the discharge side of said pump up thru the bottom of said first named vessel into the bottom of said second vessel, the inlet of said second conduit into said second vessel being coaxial therewith, a plurality of spray heads located in said annular chamber at spaced intervals about the periphery of said second vessel, conduit means connecting said spray heads with the upper portion of said second cylindrical vessel whereby liquor is circulated by said circulating pump upwardly thru said second vessel out the conduit means leading to said spray heads and is sprayed in the annular chamber from where it is withdrawn thru the circulating pump, overflow means for maintaining a level of liquid in said annular chamber above the bottom of said cylindrical vessel, gas inlet and gas outlet means arranged to bring gas into contact with the spray in said annular chamber, a vertical conduit rising from said gas outlet means, a spray head in said vertical conduit and pump means for circulating liquor from said overflow means to said last named spray head.

6. A closed vessel for separating a component of a gaseous mixture by adsorption in a liquid comprising; an upright chamber comprising a first vertical cylindrical member, said member having an outlet at the bottom, an outer chamber having a downward collecting bottom and comprising a second vertical cylindrical member of greater diameter than said first cylindrical member positioned in spaced overlapping relation thereto so as to define an annulus therewith, an arcuate closure member for the top of said annulus, an overflow conduit in said outer chamber with its top spaced above the bottom of the outlet opening of said first cylindrical member, a gas inlet to said annulus, a gas passageway from the top of said annulus to the interior of said first cylindrical member positioned diametrically opposite to said gas inlet, a plurality of liquid spray nozzles positioned to discharge spray throughout the entire portion of said annulus, means for removing the gaseous mixture from the upper portion of said upright chamber, means for removing liquid from the bottom of said outer chamber, and means for supplying liquid to said spray nozzles.

7. A closed vessel for separating a component of a gaseous mixture by absorption in a liquid comprising; an inner chamber comprising a first vertical cylindrical member having an inlet at the bottom, an outer chamber having a downward collecting bottom and comprising a second vertical cylindrical member of greater diameter than said first cylindrical member positioned in spaced overlapping relation thereto so as to define an annulus therewith, an arcuate closure member for the top of said annulus, an overflow conduit in said outer chamber with its top spaced above the inlet of said first member, a gas inlet to said annulus, and fluid circuit means between said annulus and said first member including a plurality of liquid spray nozzles positioned to discharge spray throughout the entire portion of said annulus, means for supplying fluid from the upper portion of said inner chamber to said spray nozzles, and means for removing liquid from the bottom of said outer chamber and for supplying the liquid to the inlet of said inner chamber.

8. A combined absorber and crystallizer comprising a pair of cylindrical chambers constituting a crystallizing vessel and a mist separator, a third cylindrical chamber larger than and concentric with one of said pair of cylindrical chambers and forming with said one cylindrical chamber an annular absorption spray chamber, a plurality of spray-heads in said absorption chamber positioned to discharge spray throughout the absorption chamber, first conduit means leading from the crystallizing vessel adjacent the top thereof to said spray-heads, closure means for the bottom of said absorption chamber forming a liquid collecting basin, second conduit means leading from said collecting basin to the bottom of said crystallizing vessel, pump means arranged in said second conduit means to cause solution to flow from said collecting basin into the bottom of said crystallizing vessel, and closure means for said crystallizing vessel whereby liquid pumped into the bottom of said crystallizing vessel forces liquid from adjacent the top of said crystallizing vessel to the spray-heads.

9. A combined absorber and crystallizer comprising a crystallizing vessel and a mist separator comprising connected cylindrical chambers arranged one above the other about a common vertical axis, a cylindrical absorption chamber concentric with and surrounding one of said cylindrical chambers and forming with said one chamber an annular spray chamber, a plurality of spray-heads in said spray chamber positioned to discharge spray throughout the spray chamber, first conduit means leading from the crystallizing vessel adjacent the top thereof to said spray-heads, closure means for the bottom of said spray chamber forming a liquid collecting basin, second conduit means leading from the collecting basin to the bottom of said crystallizing vessel and including pump means to cause solution to flow from said collecting basin into the bottom of said crystallizing vessel, and closure means for said crystallizing vessel whereby the liquid pumped into the bottom of said crystallizing vessel forces liquid from adjacent the top of said crystallizing vessel to flow to said spray-heads.

10. Apparatus for separating a component of a gaseous mixture by solution in a liquid and recovering the said component as a constituent in crystal-form, the apparatus comprising: a crystallizing bowl consisting of an enclosed cylindrical chamber having an inlet at the bottom end and an outlet at the top; an absorption chamber comprising a cylindrical outer wall concentrically arranged with relation to the said crystallizing bowl to enclose an annular space around said bowl; an overflow for said absorption chamber arranged to maintain a constant liquid level in the bottom of said absorption chamber; gas inlet and gas outlet means for the said absorption chamber arranged at diametrically opposite sides of the chamber, the wall of the said crystallizing bowl and the outer wall of the absorption chamber forming a dual passage for gas from said gas inlet to said gas outlet means; sprays located at spaced intervals in said absorption chamber; and a flow circuit comprising conduit means for transferring solution from the outlet of said crystallizing bowl to the said sprays, a second conduit for transferring solution from the bottom of the absorption chamber to the bottom of the crystallizing bowl and a pump disposed in said circuit for maintaining flow therethrough.

References Cited in the file of this patent

UNITED STATES PATENTS

| | | |
|---|---|---|
| 853,517 | Osborne | May 14, 1907 |
| 1,264,263 | Brassert | Apr. 30, 1918 |
| 1,895,652 | Fisher | Jan. 31, 1933 |
| 1,936,308 | Mueller | Nov. 21, 1933 |
| 2,368,901 | Tiddy | Feb. 6, 1945 |
| 2,375,922 | Jeramiassen | May 15, 1945 |
| 2,383,171 | Tiddy | Feb. 21, 1945 |
| 2,424,205 | Otto | July 15, 1947 |
| 2,424,206 | Otto | July 15, 1947 |
| 2,439,547 | Otto | Apr. 13, 1948 |
| 2,482,643 | Tiddy | Sept. 20, 1949 |
| 2,549,848 | Otto | Apr. 24, 1951 |
| 2,599,067 | Otto | June 3, 1952 |
| 2,645,559 | Otto | July 14, 1953 |

FOREIGN PATENTS

| | | |
|---|---|---|
| 634,153 | Great Britain | Mar. 15, 1950 |
| 651,282 | Great Britain | Mar. 14, 1951 |